US009898508B2

(12) United States Patent
Liang et al.

(10) Patent No.: US 9,898,508 B2
(45) Date of Patent: Feb. 20, 2018

(54) METHOD AND DEVICE FOR PROCESSING INFORMATION

(71) Applicant: Baidu Online Network Technology (Beijing) Co., Ltd, Beijing (CN)

(72) Inventors: Bian Liang, Beijing (CN); Xie Guo, Beijing (CN); Yongyi Sun, Beijing (CN); Sheng Liu, Beijing (CN); Daoquan Zhang, Beijing (CN); Yuxian Wang, Beijing (CN); Xiaofeng Shi, Beijing (CN); Yong Wang, Beijing (CN); Yujian Chen, Beijing (CN); Chengqi Li, Beijing (CN); Xiaolin Liu, Beijing (CN); Xujia Zhu, Beijing (CN); Feng Ren, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 240 days.

(21) Appl. No.: 14/586,679

(22) Filed: Dec. 30, 2014

(65) Prior Publication Data

US 2016/0070757 A1    Mar. 10, 2016

(30) Foreign Application Priority Data

Sep. 9, 2014 (CN) .......................... 2014 1 0456925

(51) Int. Cl.
    *G06F 17/30* (2006.01)
(52) U.S. Cl.
    CPC .. *G06F 17/30483* (2013.01); *G06F 17/30404* (2013.01); *G06F 17/30427* (2013.01)
(58) Field of Classification Search
    CPC ......... G06F 17/30292; G06F 17/30398; G06F 17/30917; G06F 17/30979; G06F 17/2264;

(Continued)

(56) References Cited

U.S. PATENT DOCUMENTS 6,789,074 B1 * 9/2004 Hara ................. G06F 17/30471
9,104,762 B1 * 8/2015 Ward ................. G06F 17/30864
(Continued)

FOREIGN PATENT DOCUMENTS

CN    101021875 A    8/2007
CN    101493830 A    7/2009
(Continued)

OTHER PUBLICATIONS

EP, Extended European Search Report, EP Application No. 14200683.2, dated Feb. 5, 2016.
(Continued)

*Primary Examiner* — Debbie Le
(74) *Attorney, Agent, or Firm* — Orrick, Herrington & Sutcliffe LLP (57) ABSTRACT

The embodiments of the present invention provide a method for processing information, comprising: obtaining attribute information about a target field; obtaining, according to the attribute information about the target field, attribute information about the target field described in a first language; and sending the attribute information about the target field described in the first language to a query engine using the first language, so that the query engine obtains, according to the attribute information about the target field described in the first language, data corresponding to the target field; and the embodiments of the present invention also provide an apparatus for processing information. According to the technical solutions provided in the embodiments of the present invention, attribute information about a target field being automatically described in a language can be realized, so as to improve the query efficiency of data.

20 Claims, 3 Drawing Sheets

(58) Field of Classification Search
CPC ......... G06F 17/30011; G06F 17/30277; G06F 17/30448; G06F 17/3056
USPC ..... 707/E17.005, 805, 999.003, E17.03, 705
See application file for complete search history.

(56) References Cited

U.S. PATENT DOCUMENTS

| | | | |
|---|---|---|---|
| 9,201,558 B1* | 12/2015 | Dingman | ................ G06F 3/048 |
| 2006/0161544 A1 | 7/2006 | Lee et al. | |
| 2011/0258158 A1 | 10/2011 | Resende, Jr. et al. | |
| 2014/0195514 A1* | 7/2014 | Stein | ................ G06F 17/30566 707/722 |
| 2014/0344275 A1* | 11/2014 | Matsuda | ........... G06F 17/30867 707/737 |
| 2016/0070757 A1* | 3/2016 | Liang | ................ G06F 17/30404 707/718 |

FOREIGN PATENT DOCUMENTS

| | | |
|---|---|---|
| CN | 101788992 A | 7/2010 |
| CN | 101925045 A | 12/2010 |

OTHER PUBLICATIONS

CN, Chinese Search Report, Application No. 2014104569257, dated Jan. 13, 2017.
EP, Communication pursuant to Article 94(3)EPC, Application No. 14 200 683.2, dated Jan. 30, 2017.

* cited by examiner

METHOD AND DEVICE FOR PROCESSING INFORMATION

CROSS-REFERENCE TO RELATED APPLICATIONS

The present application claims priority to Chinese Patent Application No. CN201410456925.7, filed on Sep. 9, 2014, the entire disclosure of which is incorporated herein by reference in its entirety and for all purposes.

TECHNICAL FIELD

The present invention relates to the technical field of computers, and in particular to a method and apparatus for processing information.

BACKGROUND

At present, with the flourishing development of the Internet, the speed of various types of data has increased in an exploding style. In the prior art, the method for querying data from a storage unit is: according to data which needs to be queried, using a certain language to manually describe the data which needs to be queried, wherein using a certain language to describe the data which needs to be queried is equivalent to writing a query code manually, and a query engine corresponding to the storage unit can run the query code, so as to realize automatical querying of the required data in the storage unit.

However, for different data query needs, different query codes need to be written. Moreover, the storage units of data are diverse, such as a storage unit of a Hadoop type, a storage unit of a Hive type, etc.; if the storage units of data are different, the languages used when processing data needs are also different. Therefore, at present, the method, in which a query code needs to be manually written, can only query data when different languages need to be manually learned and the query code is manually written, causing the data querying efficiency to be low at present.

SUMMARY

On that account, a method and apparatus for processing information are provided in the embodiments of the present invention, which can realize that attribute information about a target field is described automatically using a language, so as to improve the data querying efficiency.

The embodiments of the present invention provide a method for processing information, comprising:
  obtaining attribute information about a target field;
  obtaining, according to the attribute information about the target field, attribute information about the target field described in a first language; and
  sending the attribute information about the target field described in the first language to a query engine using the first language, so that the query engine obtains, according to the attribute information about the target field described in the first language, data corresponding to the target field.

In the above-mentioned method, obtaining attribute information about a target field comprises:
  receiving attribute information about a candidate field described in a second language; parsing the attribute information about the candidate field described in the second language, so as to obtain the attribute information about the candidate field; and
  removing attribute information about an incorrect candidate field from the attribute information about the candidate field, so as to obtain the attribute information about the target field.

In the above-mentioned method, the attribute information about the target field comprises the name of the target field; and obtaining, according to the attribute information about the target field, the attribute information about the target field described in a first language comprises:
  obtaining, according to the name of the target field, type information about a storage unit storing the target field;
  obtaining, according to the type information, the first language used by the query engine which queries numerical values of the target field; and
  obtaining, according to the first language and the attribute information about the target field, the attribute information about the target field described in the first language.

In the above-mentioned method, the attribute information about the target field further comprises a clustering function of the target field, the clustering function of the target field being used for the query engine to perform clustering processing on the obtained numerical values corresponding to the target field, wherein the clustering function comprises at least one of the following functions: a sum function, an averaging function, a counting function, a maximizing function and a minimizing function; and/or,
  the attribute information about the target field further comprises a screening condition of the target field, the screening condition of the target field being used for the query engine to perform screening processing on the obtained numerical values corresponding to the target field.

In the above-mentioned method, the first language comprises Microsoft (M) Language, R Language, Hive Query Language (HQL) or Structured Query Language (SQL).

The embodiments of the present invention provide an apparatus for processing information, comprising:
  an acquisition unit for obtaining attribute information about a target field;
  a processing unit for obtaining, according to the attribute information about the target field, attribute information about the target field described in a first language; and
  a sending unit for sending the attribute information about the target field described in the first language to a query engine using the first language, so that the query engine obtains, according to the attribute information about the target field described in the first language, data corresponding to the target field.

In the above-mentioned apparatus, the acquisition unit is specifically used for:
  receiving attribute information about a candidate field described in a second language; parsing the attribute information about the candidate field described in the second language, so as to obtain the attribute information about the candidate field; and
  removing attribute information about an incorrect candidate field from the attribute information about the candidate field, so as to obtain the attribute information about the target field.

In the above-mentioned apparatus, the attribute information about the target field comprises the name of the target field; and the processing unit is specifically used for:
  obtaining, according to the name of the target field, type information about a storage unit storing the target field;
  obtaining, according to the type information, the first language used by the query engine which queries numerical values of the target field; and obtaining, according to the first language and the attribute information about the target field, the attribute information about the target field described in the first language.

In the above-mentioned apparatus, the attribute information about the target field further comprises a clustering function of the target field, the clustering function of the target field being used for the query engine to perform clustering processing on the obtained numerical values corresponding to the target field, wherein the clustering function comprises at least one of the following functions: a sum function, an averaging function, a counting function, a maximizing function and a minimizing function; and/or, the attribute information about the target field further comprises a screening condition of the target field, the screening condition of the target field being used for the query engine to perform screening processing on the obtained numerical values corresponding to the target field.

In the above-mentioned apparatus, the first language comprises Microsoft (M) Language, R Language, Hive Query Language (HQL) or Structured Query Language (SQL).

It can be seen from the foregoing technical solutions that the embodiments of the present invention have the beneficial effects as follows:

in the embodiments of the present invention, attribute information about a target field can be described in a language used by a query engine, and then the obtained attribute information about the target field described in the language is sent to the query engine; then the query engine can query numerical values of the target field according to the attribute information about the target field described in the language, so as to obtain data corresponding to the target field. In this way, the embodiments of the present invention can realize that data which needs querying is described automatically using a language, so as to generate a query code automatically; compared with the technical solution of manually using a certain language to describe data which needs to be queried in the prior art, there is no need to write a query code manually any more, and the data querying efficiency can be improved.

BRIEF DESCRIPTION OF THE ACCOMPANYING DRAWINGS

In order to illustrate the technical solutions of the embodiments of the present invention more clearly, the accompanying drawings which need to be used in the embodiments are briefly introduced hereinafter. Apparently, the accompanying drawings in the following description are merely a few embodiments of the present invention, and those of ordinary skill in the art can also obtain other drawings from these drawings without involving any inventive effort.

DETAILED DESCRIPTION OF THE PREFERRED EMBODIMENTS

For a better understanding of the technical solutions of the present invention, the embodiments of the present invention are described in detail below in conjunction with the accompanying drawings.

It should be clear that the described embodiments are merely a portion of the embodiments of the present invention, rather than all the embodiments. All other embodiments obtained by those of ordinary skill in the art based on the embodiments of the present invention and without making any inventive effort are within the scope of protection of the present invention.

The terms used in the embodiments of the present invention are merely for the purpose of illustrating particular embodiments, and are not intended to limit the present invention. The terms "a", "said" and "the" of singular forms used in the embodiments and the appended claims of the present invention are also intended to include plural forms, unless otherwise clearly specified in the context.

It should be understood that the term "and/or" used herein is merely an association relationship describing associated objects, and indicates that three relationships may exist, for example, A and/or B may indicate: the three cases where A exists alone, A and B exist simultaneously, and B exists alone. In addition, the character "/" herein generally indicates an "or" relationship between associated objects.

It should be understood that although the language may be described using the terms first, second, etc. in the embodiments of the present invention, the key words should not be limited to these terms. These terms are only used for distinguishing the key words from one another. For example, without departing from the scope of the embodiments of the present invention, the first language may also be referred to as a second language, and similarly, the second language may also be referred to as a first language.

As used herein, the term "if" may be construed as "when" or "upon" or "in response to determining" or "in response to detecting", depending on the context. Similarly, the phrase "if it is determined" or "if (a stated condition or event) is detected" may be construed as "upon determining" or "in response to determining" or "upon detecting (the stated condition or event)" or "in response to detecting (the stated condition or event)", depending on the context.

Figure 1:
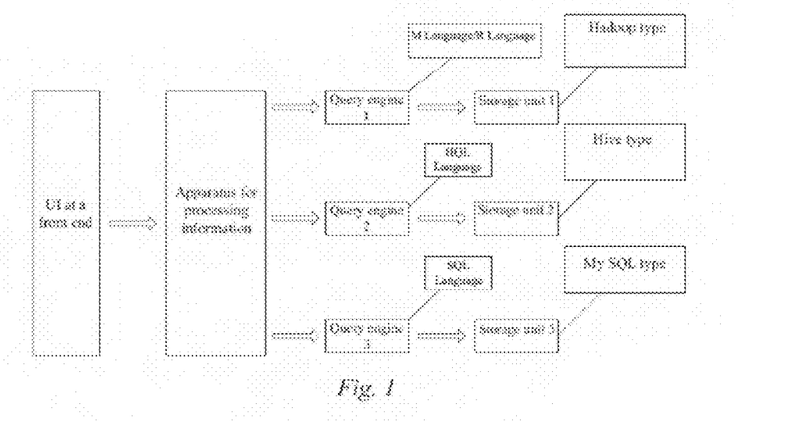
FIG. 1 is a schematic diagram of a system used in the technical solutions provided in the embodiments of the present invention.

The system used in the technical solutions provided in the embodiments of the present invention is as shown in FIG. 1, which is primarily composed of a user interface (UI), an apparatus for processing information, a query engine and a storage unit, and the method provided in the embodiments of the present invention is implemented at the side of the apparatus for processing information.

Figure 2:
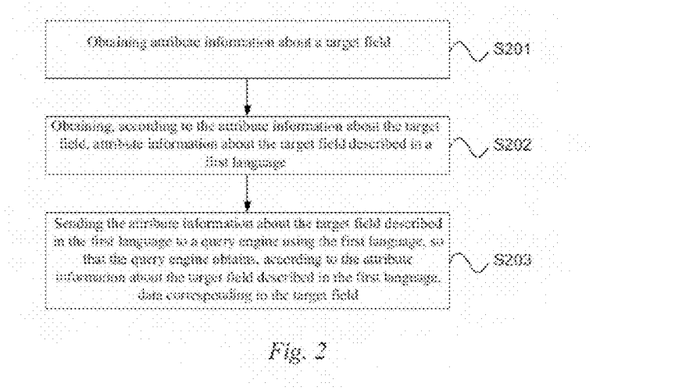
FIG. 2 is a schematic diagram of a flow of a method for processing information provided in the embodiments of the present invention.

A method for processing information is provided in the embodiments of the present invention. Please refer to FIG. 2, which is a schematic diagram of a flow of the method for processing information provided in the embodiments of the present invention, and as shown in the figure, the method comprises the steps as follows:

S201, attribute information about a target field is obtained.

Specifically, in the embodiments of the present invention, the method of obtaining attribute information about a target field by means of the apparatus for processing information may comprise:

first of all, attribute information about a candidate field described in a second language, which is sent by a UI at a front end, is received; and then the attribute information about the candidate field described in the second language is parsed to obtain the attribute information about the candidate field. After that, attribute information about an incorrect candidate field is removed from the attribute information about the candidate field, so as to obtain the attribute information about the target field.

Preferably, the UI at the front end can receive the attribute information about a candidate field configured by a user, wherein the attribute information about the candidate field may comprise the name of the candidate field, and may also comprise at least one of a clustering function of the candidate field and a screening condition of the candidate field.

Since there will be a large number of fields and numerical values corresponding to each field in a storage unit at a back end, when the query engine needs to query certain numerical values in the storage unit, the UI at the front end needs to receive the name of the field corresponding to the configured numerical values which needs to be queried, and the name of the field is taken as the name of the above-mentioned candidate field. For example, each search log stored in the storage unit contains a field A, a field B, a field C and a field D, and if the query engine needs to query the numerical values of field B, then the user needs to input the name of field B on the UI at the front end.

Figure 3:
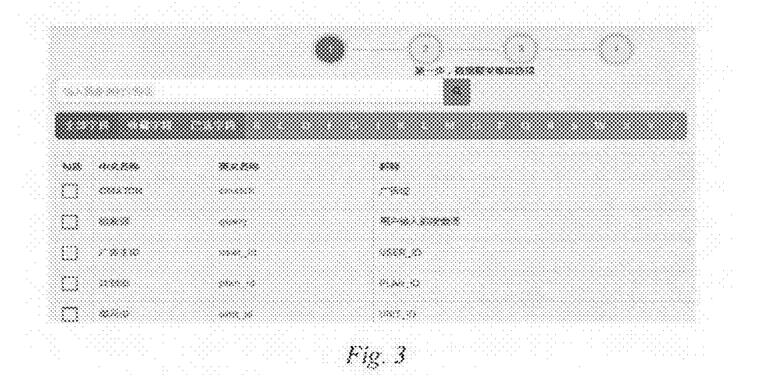
FIG. 3 is a schematic diagram of a UI at the front end in the embodiments of the present invention.

For example, please refer to FIG. 3, which is a schematic diagram of a UI at the front end in the embodiments of the present invention; as shown in the figure, the names of a plurality of fields are displayed on the UI at the front end, and the user can tick at least one candidate field in the plurality of fields.

The clustering function of the candidate field is used for the query engine to perform clustering processing on the numerical values corresponding to the obtained candidate field. Preferably, the clustering function may comprise at least one of the following functions: a sum function, an averaging function, a counting function, a maximizing function and a minimizing function. Accordingly, if the clustering function comprises the sum function, then after having queried the numerical values, the query engine may perform a sum calculation on the queried numerical value. If the clustering function comprises the averaging function, then after having queried the numerical value, the query engine may perform an averaging calculation on the queried numerical value. If the clustering function comprises the counting function, then after having queried the numerical value, the query engine may collect number statistics of the queried numerical value. If the clustering function comprises the maximizing function, then after having queried the numerical value, the query engine may obtain the maximum value among the queried numerical values. If the clustering function comprises the minimizing function, then after having queried the numerical value, the query engine may obtain the minimum value among the queried numerical values. It can be understood that the clustering function may also comprise other functions for collecting statistics on the numerical values, and the above-mentioned clustering functions are only described as examples, and the clustering functions are not limited to only containing the above-mentioned functions.

The screening condition of the candidate field is used for the query engine to perform screening processing on the obtained numerical values according to the screening condition.

Preferably, performing screening processing on the obtained numerical values according to the screening condition may comprise at least one of the following types of screening processing: performing screening processing on the numerical values according to a black list or a white list; performing screening processing on the numerical values based on a threshold; performing screening processing on the numerical values of the field based on accurate matching or fuzzy matching; performing screening processing on the numerical values based on a time interval; and performing screening processing on the numerical values of the field based on the occurrence frequency.

For example, if the screening condition is that a retrieval term contains "flowers express delivery", the field corresponding to the retrieval term is queried to obtain all the retrieval terms; then screening processing is performed on the retrieval terms, so as to obtain a retrieval term containing "flowers express delivery". As another example, if the screening condition is the time interval of 8 am to 10 pm, then screening processing is performed on the obtained numerical values, and only numerical values in the logs from 8 am to 10 pm remain. As another example, if the screening condition is to obtain a retrieval term with the largest occurrence frequency, the field corresponding to the retrieval term is queried, so as to obtain retrieval terms; and statistics are collected on the occurrence frequency of each retrieval term, then the retrieval term with the greatest occurrence frequency is obtained.

The method that the UI at the front end can receive attribute information about a candidate field input by a user may comprise at least in which one of the following three means:

first: the UI at the front end can receive the attribute information about the candidate field directly input by the user.

Second: the UI at the front end can receive the attribute information about the candidate field selected from several options by the user.

Third: the UI at the front end can find a configuration file from a preset file address according to the file address, thus automatically acquiring the attribute information about the candidate field from the configuration file. This method is applicable to the case where there is a large amount of attribute information about the candidate field, and the attribute information about the candidate field can be obtained in batches through the configuration file.

After obtaining the attribute information about the candidate field, the UI at the front end uses a preset second language to describe the attribute information about the candidate field, and then sends the obtained attribute information about the candidate field described in the second language to an apparatus for processing information at the back end; in this way, the apparatus for processing information can receive the attribute information about the candidate field described in the second language, which is sent by the UI at the front end. For example, the second language may comprise a Structured Query Language (SQL) or a data format. For example, the data format may comprise a lightweight data interchange format (JavaScript Object Notation, JSON).

After obtaining the attribute information about the candidate field described in the second language from the UI at the front end, the apparatus for processing information at the back end can obtain the attribute information about the candidate field by performing parsing processing on the attribute information about the candidate field described in the second language; the apparatus for processing information also needs to further perform a correctness judgment on the obtained attribute information about the candidate field, and judges whether the name of the attribute field is correct or not; if not, the name of the incorrect field and a clustering function and screening condition regarding the incorrect field are removed from the attribute information about the candidate field, so that it is realized that the attribute information about the incorrect candidate field is removed from the attribute information about the candidate field, and the attribute information about the remaining candidate field can be taken as the attribute information about the target field in the embodiments of the present invention.

It can be understood that the attribute information about the target field may comprise the attribute information about all or part of the candidate field; therefore, the attribute information about the target field can comprise the name of the target field, and can also comprise at least one of the clustering function of the target field and the screening condition of the target field. By the same reasoning, the clustering function of the target field is used for the query engine to perform clustering processing on the obtained numerical values corresponding to the target field, wherein the clustering function comprises at least one of the following functions: a sum function, an averaging function, a counting function, a maximizing function and a minimizing function. The attribute information about the target field further comprises a screening condition of the target field, the screening condition of the target field being used for the query engine to perform screening processing on the obtained numerical values corresponding to the target field.

S202, attribute information about the target field described in a first language is obtained according to the attribute information about the target field.

Specifically, after obtaining the attribute information about the target field, the apparatus for processing information at the back end can obtain the attribute information about the target field described in the first language.

By way of example, the method of obtaining attribute information about the target field described in a first language according to the attribute information about the target field may comprise:

first of all, type information about a storage unit storing the target field is obtained according to the name of the target field.

For example, it is possible to obtain a table storing the target field or to obtain at least two tables storing the target field, according to the name of the target field and a preset corresponding relationship between the name of a field and a table.

If at least two tables storing the target field are obtained, then one, the content contained in which is the least, is selected; and the selected table, the content contained in which is the least, is taken as the table for storing the target field. Here, the query speed corresponding to the table, the content contained in which is the least, is the fastest; therefore, in order to optimize the query speed, when there are at least two tables storing the target field, only one, the content in which is the least, is selected.

Figure 4:
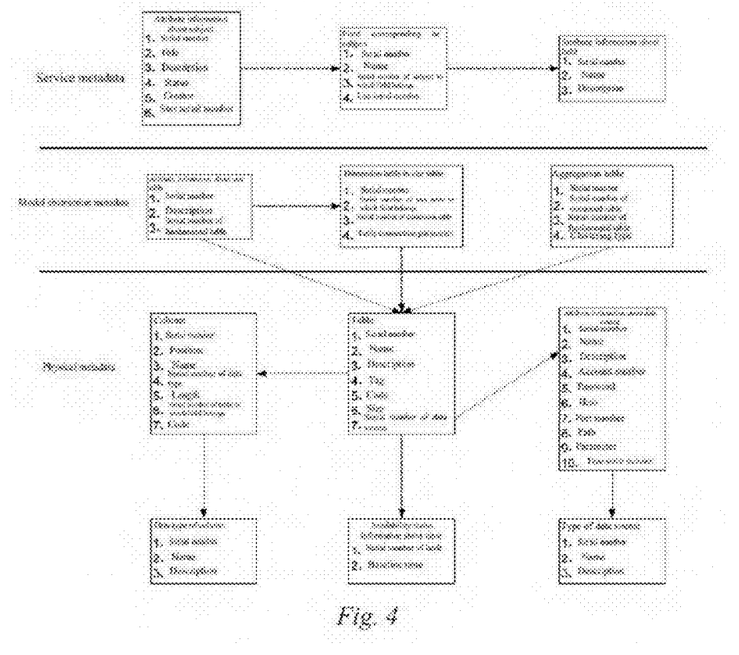
FIG. 4 is a schematic diagram of hierarchical management of metadata provided in the embodiments of the present invention.

Please refer to FIG. 4, which is a schematic diagram of hierarchical management of metadata provided in the embodiments of the present invention; as shown in the figure, after a table storing a target field is obtained, data source information is obtained according to a data source number contained in the table of the target field; information relevant to a storage unit storing the target field at the back end is stored in the data source information, such as a serial number, a name, a description, an account number, a password, a host, a port number, a path, a parameter and a type serial number, and type information about the storage unit storing the target field at the back end can be obtained according to the type serial number therein.

After that, the first language used by the query engine which queries numerical values of the target field is obtained according to the type information.

Preferably, the first language corresponding to the type information can be obtained according to the type information about the storage unit and a corresponding relationship between the type and the first language. In the embodiments of the present invention, the first language refers to a language used by the query engine which can execute a query operation at the storage unit.

Preferably, the first language comprises Microsoft (M) Language, R Language, Hive Query Language (HQL) or Structured Query Language (SQL).

Finally, the attribute information about the target field described in the first language is obtained according to the first language and the attribute information about the target field.

It can be understood that the first language, the query engine and the storage unit are in a one-to-one correspondence; each storage unit at the back end has a query engine corresponding to the storage unit, and the query engine can execute a query operation in the corresponding storage unit; however, if the query engine wants to execute a query operation in the storage unit to obtain numerical values corresponding to the target field, then the query engine needs to run an executable code, and the executable code needs to be implemented with the first language used by the query engine; in this way, the query engine can run the executable code to implement the query operation.

As shown in FIG. 1, if the storage unit is a storage unit of the Hadoop type, and the first language used by the query engine corresponding to the storage unit of the Hadoop type is M Language or R Language, then the first language corresponding to the storage unit of the Hadoop type is M Language or R Language. As another example, if the storage unit is a storage unit of the Hive type, and the first language used by the query engine corresponding to the storage unit of the Hive type is HQL, then the first language corresponding to the storage unit of the Hive type is HQL. As another example, if the storage unit is a storage unit of the My SQL type, and the first language used by the query engine corresponding to the storage unit of the My SQL type is SQL, then the first language corresponding to the storage unit of the My SQL type is SQL.

S203, the attribute information about the target field described in the first language is sent to a query engine using the first language, so that the query engine obtains, according to the attribute information about the target field described in the first language, data corresponding to the target field.

Specifically, after obtaining the attribute information about the target field described in the first language, the apparatus for processing information sends the attribute information about the target field described in the first language to the query engine using the first language, i.e. sends it to the query engine which queries the numerical values of the target field, so that, after receiving the attribute information about the target field described in the first language, the query engine obtains, according to the attribute information about the target field described in the first language, data corresponding to the target field.

For example, the query engine can run the attribute information about the target field described in the first language, then reads the attribute information about the target field therein according to the grammar in the first language, and queries the numerical values corresponding to the target field in the corresponding storage unit according to the name of the target field therein; after the numerical values corresponding to the target field are obtained, it is possible to directly return the numerical value, as data corresponding to the target field, to the UI at the front end for display, and it is also possible to perform clustering processing and/or screening processing on the queried numerical values according to the clustering function and/or screening condition in the attribute information about the target field, and return the data obtained after processing, as the data corresponding to the target field, to the UI at the front end for display.

With the development of the back end platform, a large number of storage units need to be accessed; therefore, in order to better manage and maintain data in the storage units, metadata needs to be used, wherein the metadata is primarily used for describing which data is in which storage unit, defining data to be entered into the storage units and data to be produced from the storage units and so on.

As shown in FIG. 4, the metadata has three layers, which from top to bottom are: service metadata, model abstraction metadata, and physical metadata.

The service metadata refers to data stored in the storage units which is described from a service point of view, and primarily contains attribute information about a subject, a field corresponding to each subject and attribute information about each field. The service metadata can also comprise a clustering function and/or a screening condition.

The model abstraction metadata supports two data query modes, i.e. a star data query mode and a single-table data query mode. As shown in FIG. 4, if it is the star data query mode, the model abstraction metadata contains attribute information about a star table, a dimension table in the star table and an aggregation table corresponding to the dimension table. The star table contains a fundamental table and at least one dimension table, wherein the fundamental table is used for storing an identifier of at least one field, and the dimension table is used for storing a corresponding relationship between an identifier of a field and the name of the field.

As shown in FIG. 4, the physical metadata is used for recording, in the form of a table, the attribute information about data stored in the storage unit. The table can comprise several columns, and each column is used for storing the attribute information about a field, such as a serial number, a position, a name, a serial number of a data type, a length, a serial number of the table to which the field belongs, a code, etc.; and the physical metadata also contains availability status information about the table, and the availability status information can indicate whether the content in the table is available, and in which time period it is available and so on. For each column, the physical metadata also contains the data type of the column. The table also contains the attribute information about the table per se, such as a serial number, a name, description, a tag, a code, a size and the serial number of the data source in which the field is located. The attribute information about the corresponding data source can be obtained according to the serial number of the data source, such as a serial number, a name, a description, an account number, a password, a host, a port number, a path, a parameter and a type serial number of the data source. For the data source, the physical metadata can also store type information corresponding to the type serial number of the data source, such as the type serial number, type name and description of the data source.

The embodiments of the present invention further provide a device embodiment implementing each step and method in the above-mentioned method embodiments.

Figure 5:
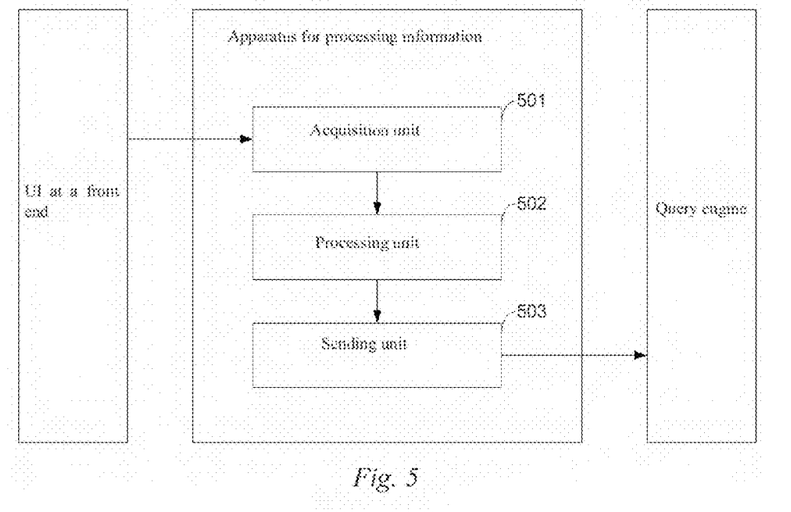
FIG. 5 is a functional block diagram of an apparatus for processing information provided in the embodiments of the present invention.

Please refer to FIG. 5, which is a functional block diagram of an apparatus for processing information provided in the embodiments of the present invention. As shown in the figure, the apparatus comprises:

an acquisition unit 501 for obtaining attribute information about a target field;

a processing unit 502 for obtaining, according to the attribute information about the target field, obtaining attribute information about the target field described in a first language; and a sending unit 503 for sending the attribute information about the target field described in the first language to a query engine using the first language, so that the query engine obtains, according to the attribute information about the target field described in the first language, data corresponding to the target field.

Preferably, the acquisition unit 501 is specifically used for:

receiving attribute information about a candidate field described in a second language; parsing the attribute information about the candidate field described in the second language to obtain the attribute information about the candidate field; and removing attribute information about an incorrect candidate field from the attribute information about the candidate field, so as to obtain the attribute information about the target field.

Preferably, the attribute information about the target field comprises the name of the target field; and the processing unit 502 is specifically used for:

obtaining, according to the name of the target field, type information about a storage unit storing the target field;

obtaining, according to the type information, the first language used by the query engine which queries numerical values of the target field; and obtaining, according to the first language and the attribute information about the target field, the attribute information about the target field described in the first language.

Preferably, the attribute information about the target field further comprises a clustering function of the target field, the clustering function of the target field being used for the query engine to perform clustering processing on the obtained numerical values corresponding to the target field, wherein the clustering function comprises at least one of the following functions: a sum function, an averaging function, a counting function, a maximizing function and a minimizing function; and/or, the attribute information about the target field further comprises a screening condition of the target field, the screening condition of the target field being used for the query engine to perform screening processing on the obtained numerical values corresponding to the target field.

Preferably, the first language comprises Microsoft (M) Language, R Language, Hive Query Language (HQL) or Structured Query Language (SQL).

Since various units in this embodiment can execute the method shown in FIG. 2, for the part not described in detail in this embodiment, reference can be made to the relevant explanation about FIG. 2.

The technical solutions of the embodiments of the present invention have the beneficial effects as follows:

in the embodiments of the present invention, attribute information about a target field can be described in a language used by a query engine, and then the obtained attribute information about the target field described in the language is sent to the query engine; then the query engine can query numerical values of the target field according to the attribute information about the target field described in the language, so as to obtain data corresponding to the target field. In this way, the embodiments of the present invention can realize that data which needs to be queried is described automatically using a language, so as to generate a query code automatically; compared with the technical solution of manually using a certain language to describe data which needs to be queried in the prior art, there is no need to write a query code manually any more, and the data querying efficiency can be improved.

Those of ordinary skill in the art may clearly understand that, for the convenience and brevity of description, the specific operation processes of the above systems, apparatuses and units may refer to the corresponding processes in the method embodiments, which will not be described here.

In a few embodiments provided in the present invention, it shall be understood that the disclosed system, apparatus and method may be implemented in other manners. For example, the apparatus embodiments described above are merely illustrative, for example, the division of the units is merely a logical function division, and there may be other division manners during actual implementation. For example, a plurality of units or components may be combined or may be integrated into another system, or some features may be omitted, or not executed. In another point, the shown or discussed coupling or direct coupling or communication connection therebetween may be an indirect coupling or a communication connection via some interfaces, apparatuses or units, and may be electrical, mechanical or in other forms.

The units described as separate components may or may not be physically separated, and components displayed as units may or may not be physical units, that is, may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with functional software units.

The integrated unit implemented by functional software units may be stored in a computer readable storage medium. The functional software units are stored in a storage medium and include several instructions for enabling a computer apparatus (which can be a personal computer, a server, or a network apparatus and so on) or a processor to execute some steps of the method described in the embodiments of the present invention. The foregoing storage medium comprises: various media that may store program codes, such as a U-disk, a removable hard disk, a read-only memory (ROM), a random access memory (RAM), a magnetic disk, or an optical disk.

The above description is merely preferred embodiments of the present invention, but is not used to limit the present invention. Any modification, equivalent replacement or improvement made within the spirit and principle of the present invention shall fall within the scope of protection of the present invention.

What is claimed is:

1. A method for processing information, comprising:
   obtaining, at a front end, attribute information about a target field corresponding to data stored in one or more storage units at a back end, each storage unit corresponding to a respective query engine configured to execute a query operation in a language based on type information of the storage unit, the attribute information including a name of the target field;
   obtaining a table storing the target field according to the name of the target field and a preset corresponding relationship between the name of the target field and the table;
   obtaining data source information of a selected storage unit storing the target field based upon the obtained table, the data source information including a type serial number of the selected storage unit;
   obtaining the type information of the selected storage unit based upon the type serial number;
   obtaining attribute information about the target field described in a first language according to the type information about the selected storage unit; and
   sending the attribute information about the target field described in the first language to a query engine using the first language so that the query engine obtains data corresponding to the target field based upon the attribute information about the target field described in the first language.

2. The method of claim 1, wherein said obtaining the attribute information about the target field comprises:
   receiving attribute information about a candidate field described in a second language;
   parsing the attribute information about the candidate field described in the second language so as to obtain the attribute information about the candidate field; and
   removing attribute information about an incorrect candidate field from the attribute information about the candidate field so as to obtain the attribute information about the target field.

3. The method of claim 1,
   wherein said obtaining the attribute information about the target field described in the first language comprises:
   obtaining the first language used by the query engine that queries numerical values of the target field based upon the type information; and
   obtaining the attribute information about the target field described in the first language based upon the first language and the attribute information about the target field.

4. The method of claim 3, wherein the attribute information about the target field further comprises a clustering function of the target field, the clustering function of the target field being used for the query engine to perform clustering processing on the obtained numerical values corresponding to the target field.

5. The method of claim 4, wherein the clustering function comprises a sum function, an averaging function, a counting function, a maximizing function and a minimizing function, or a combination thereof.

6. The method of claim 3, wherein the attribute information about the target field further comprises a screening condition of the target field, the screening condition of the target field being used for the query engine to perform screening processing on the obtained numerical values corresponding to the target field.

7. The method of claim 1, wherein the first language comprises Microsoft (M) Language, R Language, Hive Query Language (HQL) and Structured Query Language (SQL), or a combination thereof.

8. An apparatus for processing information, comprising:
   a processor; and
   a computer storage medium having one or more programs stored thereon for instructing said processor, the programs including instruction for:

obtaining, at a front end, attribute information about a target field corresponding to data stored in one or more storage units at a back end, each storage unit corresponding to a respective query engine configured to execute a query operation in a language based on type information of the storage unit, the attribute information including a name of the target field;

obtaining a table storing the target field according to the name of the target field and a preset corresponding relationship between the name of the target field and the table;

obtaining data source information of a selected storage unit storing the target field based upon the obtained table, the data source information including a type serial number of the selected storage unit;

obtaining the type information of the selected storage unit based upon the type serial number;

obtaining attribute information about the target field described in a first language according to the type information about the selected storage unit; and sending the attribute information about the target field described in the first language to a query engine using the first language so that the query engine obtains, according to the attribute information about the target field described in the first language, data corresponding to the target field.

9. The method of claim 1, further comprising determining the first language based on the type information about the selected storage unit prior to said obtaining the attribute information about the target field described in the first language.

10. The method of claim 1, wherein said obtaining the table storing the target field comprises:

obtaining at least two tables that store the target field from the data stored in the one or more storage units; and selecting, from the at least two tables, a table containing the least content to obtain the data source information based on the table.

11. The method of claim 1, wherein said obtaining the table storing the target field comprises:

obtaining a serial number of the table based upon physical metadata for recording the name of the target field and a serial number of the table corresponding to the name of the target field; and obtaining the table storing the target field based upon the serial number of the table.

12. The apparatus of claim 8, wherein the programs include instruction for:

receiving attribute information about a candidate field described in a second language;

parsing said attribute information about the candidate field described in the second language so as to obtain said attribute information about the candidate field; and removing attribute information about an incorrect candidate field from the attribute information about said candidate field so as to obtain the attribute information about the target field.

13. The apparatus of claim 12, wherein the attribute information about the target field further comprises a clustering function of the target field, the clustering function of the target field being used for the query engine to perform clustering processing on the obtained numerical values corresponding to the target field.

14. The apparatus of claim 13, wherein the clustering function comprises a sum function, an averaging function, a counting function, a maximizing function and a minimizing function, or a combination thereof.

15. The apparatus of claim 12, wherein the attribute information about the target field further comprises a screening condition of the target field, the screening condition of the target field being used for the query engine to perform screening processing on the obtained numerical values corresponding to the target field.

16. The apparatus of claim 8, wherein the programs include instruction for obtaining, according to the type information, the first language used by the query engine which queries numerical values of the target field; and obtaining, according to the first language and the attribute information about the target field, the attribute information about the target field described in the first language.

17. The apparatus of claim 8, wherein the first language comprises Microsoft (M) Language, R Language, Hive Query Language (HQL) and Structured Query Language (SQL), or a combination thereof.

18. A non-transitory computer storage medium including at least one program for processing information when implemented by a processor, comprising:

instruction for obtaining, at a front end, attribute information about a target field corresponding to data stored in one or more storage units at a back end, each storage unit corresponding to a respective query engine configured to execute a query operation in a language based on type information of the storage unit, the attribute information including a name of the target field;

instruction for obtaining a table storing the target field according to the name of the target field and a preset corresponding relationship between the name of the target field and the table;

instruction for obtaining data source information of a selected storage unit storing the target field based upon the obtained table, the data source information including a type serial number of the selected storage unit;

instruction for obtaining the type information of the selected storage unit based upon the type serial number;

instruction for obtaining attribute information about the target field described in a first language according to the type information about the selected storage unit; and instruction for sending the attribute information about the target field described in the first language to a query engine using the first language so that the query engine obtains data corresponding to the target field based upon the attribute information about the target field described in the first language.

19. The computer storage medium of claim 18, wherein said instruction for obtaining the attribute information about the target field comprises:

instruction for receiving attribute information about a candidate field described in a second language;

instruction for parsing the attribute information about the candidate field described in the second language so as to obtain the attribute information about the candidate field; and instruction for removing attribute information about an incorrect candidate field from the attribute information about the candidate field so as to obtain the attribute information about the target field.

20. The computer storage medium of claim 18, wherein said instruction for obtaining the attribute information about the target field described in the first language comprises:

instruction for obtaining the first language used by the query engine that queries numerical values of the target field based upon the type information; and instruction for obtaining the attribute information about the target field described in the first language based upon the first language and the attribute information about the target field.

\* \* \* \* \*